(12) United States Patent
Foster

(10) Patent No.: US 6,827,772 B2
(45) Date of Patent: Dec. 7, 2004

(54) CARBON BLACK AND COMPOSITIONS CONTAINING SAME

(75) Inventor: John K. Foster, Windham, NH (US)

(73) Assignee: Cabot Corporation, Boston, MA (US)

(*) Notice: Subject to any disclaimer, the term of this patent is extended or adjusted under 35 U.S.C. 154(b) by 73 days.

(21) Appl. No.: 10/155,906

(22) Filed: May 24, 2002

(65) Prior Publication Data

US 2003/0219373 A1 Nov. 27, 2003

(51) Int. Cl.$^7$ .............................................. C09D 11/00
(52) U.S. Cl. ....................... 106/31.9; 106/472; 106/478
(58) Field of Search ............................... 106/31.9, 472, 106/478

(56) References Cited

U.S. PATENT DOCUMENTS

| | | | |
|---|---|---|---|
| 2,420,810 A | 5/1947 | Bray et al. ................. 23/209.1 |
| 3,216,843 A | 11/1965 | Heller et al. ................. 106/307 |
| 3,245,820 A | 4/1966 | Melore et al. ............... 106/307 |
| 3,279,935 A | 10/1966 | Daniell et al. ............... 106/307 |
| 3,318,720 A | 5/1967 | Johnson et al. ............. 106/307 |
| 3,398,009 A | 8/1968 | Deery ......................... 106/307 |
| 3,536,512 A | 10/1970 | Deery, Jr. .................... 106/307 |
| 3,619,140 A | 11/1971 | Morgan et al. .............. 23/209.4 |
| 3,671,663 A | 6/1972 | Seifert et al. ................. 174/120 |
| 3,725,103 A | 4/1973 | Jordon et al. ............... 106/307 |
| 3,922,335 A | 11/1975 | Jordon et al. ............... 423/450 |
| 3,959,008 A * | 5/1976 | Warner et al. .............. 106/478 |
| RE28,974 E | 9/1976 | Morgan et al. ............. 423/450 |
| 3,988,478 A | 10/1976 | Wiggins ..................... 423/445 |
| 4,164,423 A | 8/1979 | Schumacher et al. ......... 106/20 |
| 4,221,772 A | 9/1980 | Eisenmenger et al. ...... 423/445 |
| 4,519,841 A * | 5/1985 | Moynihan ................ 106/31.67 |
| 4,774,147 A | 9/1988 | Kuse et al. .................. 428/323 |
| 4,994,629 A * | 2/1991 | Tatum et al. ................... 174/6 |
| 5,026,755 A | 6/1991 | Kveglis et al. .............. 524/389 |
| 5,184,148 A | 2/1993 | Suga et al. ................... 346/1.1 |
| 5,258,223 A | 11/1993 | Inaba et al. ................. 428/323 |
| 5,266,406 A | 11/1993 | Hartog et al. ............... 428/423 |
| 5,382,621 A | 1/1995 | Laube ......................... 524/496 |
| 5,439,514 A | 8/1995 | Kashiwazaki et al. ........ 106/20 |
| 5,455,112 A | 10/1995 | Inaba et al. ................. 428/323 |
| 5,624,484 A | 4/1997 | Takahashi et al. ......... 106/31.75 |
| 5,658,376 A * | 8/1997 | Noguchi et al. ......... 106/31.43 |
| 5,672,423 A | 9/1997 | Inaba et al. ................. 428/323 |
| 5,686,508 A * | 11/1997 | Shimomura et al. ........ 523/161 |
| 5,688,317 A | 11/1997 | Mackay et al. ............. 106/476 |
| 5,738,714 A | 4/1998 | Hirasa et al. ............... 106/31.9 |
| 5,877,250 A | 3/1999 | Sant ........................... 524/496 |
| 5,877,251 A | 3/1999 | Sant ........................... 524/496 |
| 5,922,118 A * | 7/1999 | Johnson et al. ............ 106/31.6 |
| 5,948,843 A | 9/1999 | Boutier et al. .............. 524/313 |
| 5,981,048 A | 11/1999 | Sugimoto et al. ........... 428/216 |
| 5,993,527 A | 11/1999 | Tochihara et al. ........ 106/31.85 |
| 6,042,643 A | 3/2000 | Belmont et al. ............ 106/472 |
| 6,056,933 A | 5/2000 | Vogler et al. .............. 423/449.1 |
| 6,068,688 A | 5/2000 | Whitehouse et al. ..... 106/31.65 |
| 6,069,190 A | 5/2000 | Bates et al. ................. 523/161 |
| 6,083,316 A * | 7/2000 | Bastow ....................... 106/419 |
| 6,086,792 A * | 7/2000 | Reid et al. .................. 252/511 |
| 6,099,818 A | 8/2000 | Freund et al. ............ 423/449.1 |
| 6,221,143 B1 | 4/2001 | Palumbo ..................... 106/31.6 |
| 6,238,045 B1 | 5/2001 | Ono et al. ...................... 347/96 |
| 6,277,350 B1 | 8/2001 | Gerspacher ............. 423/449.1 |
| 6,293,195 B1 | 9/2001 | Allison, Jr. ............... 101/350.6 |
| 6,336,965 B1 | 1/2002 | Johnson et al. ............ 106/31.6 |
| 6,378,999 B1 | 4/2002 | Doi et al. ................... 347/100 |
| 6,399,674 B1 | 6/2002 | Kashiwazaki et al. ...... 523/161 |
| 6,471,763 B1 * | 10/2002 | Karl .......................... 106/478 |
| 2001/0036993 A1 | 11/2001 | McNutt et al. ............. 524/495 |
| 2002/0006982 A1 | 1/2002 | Kurabayashi ............... 523/161 |
| 2002/0014185 A1 | 2/2002 | Lamba et al. .............. 106/476 |
| 2002/0026004 A1 | 2/2002 | Goerl et al. ................ 524/495 |
| 2002/0028096 A1 | 3/2002 | Satoh et al. ................ 399/326 |
| 2002/0048655 A1 | 4/2002 | Ichinose et al. ............ 428/195 |
| 2002/0062762 A1 | 5/2002 | Tomioka et al. ......... 106/31.33 |
| 2002/0064687 A1 * | 5/2002 | Jinbo et al. ........... 428/694 BB |
| 2002/0077386 A1 | 6/2002 | Kurabayashi et al. ....... 523/161 |
| 2002/0122339 A1 | 9/2002 | Takano et al. .............. 365/200 |

FOREIGN PATENT DOCUMENTS

| | | | |
|---|---|---|---|
| EP | 0370424 | 5/1990 | |
| EP | 0841596 | 5/1998 | |
| EP | 0853106 | 7/1998 | |
| EP | 1 049 076 A1 | 11/2000 | ........... G11B/5/704 |
| GB | 2 007 696 A | 5/1979 | ........... C08L/27/06 |
| JP | 60067564 | 4/1985 | |
| JP | 61024016 | 2/1986 | |
| JP | 61143454 | 7/1986 | |
| JP | 62297341 | 12/1987 | |
| JP | 63289072 | 11/1988 | |
| JP | 1134718 | 5/1989 | |
| JP | 2141000 | 5/1990 | |
| JP | 3134073 | 6/1991 | |
| JP | 3210373 | 9/1991 | |
| JP | 4309567 | 11/1992 | |
| JP | 7331108 | 12/1995 | |
| JP | 8188672 | 7/1996 | |
| JP | 8218023 | 8/1996 | |
| JP | 8334925 | 12/1996 | |
| JP | 10095932 | 4/1998 | |
| JP | 10130676 | 5/1998 | |
| JP | 10330663 | 12/1998 | |
| JP | 11052626 | 2/1999 | |
| JP | 2000290572 | 10/2000 | |
| JP | 2000309712 | 11/2000 | |
| JP | 2001239751 | 9/2001 | |

OTHER PUBLICATIONS

Search Report for PCT/US03/16114.

* cited by examiner

*Primary Examiner*—Mark L. Bell
*Assistant Examiner*—Veronica F. Faison

(57) ABSTRACT

Novel carbon blacks are described which have a volatile content of from about 1.5 to about 3.5 and/or a moisture content of at least 0.5 along with one or more analytical properties. Inks and coating and other compositions are further described which include the carbon blacks of the present invention. Methods of decreasing the cure energy of an ink as well as methods to improve storage stability are further described.

34 Claims, 4 Drawing Sheets

CARBON BLACK AND COMPOSITIONS CONTAINING SAME

BACKGROUND OF THE INVENTION

The present invention relates to carbon black and compositions containing the carbon black. More specifically, the present invention relates to particular types of carbon blacks which promote beneficial properties in compositions such as ink compositions.

Colorants, such as carbon black, are a standard ingredient in compositions such as ink and coating compositions. These ink compositions include lithographic and flexagrophic inks wherein performance properties are generally desired by the end users. There is a continuing desire on the part of ink manufacturers to improve the properties of ink such as, reducing the cure energy needed to cure the ink and provide ink compositions that have improved storage stability. With respect to storage stability, the viscosity of the ink can greatly increase over time due to evaporation or other reasons. Thus, a goal of ink manufacturers is to provide inks that do not have an increase in viscosity over time since this is an undesirable property when the ink finally is used.

Overcoming one or more of the above-identified described disadvantages would provide an improved ink composition to the industry.

SUMMARY OF THE PRESENT INVENTION

A feature of the present invention is to provide a carbon black which provides beneficial properties to compositions such as ink compositions.

Another feature of the present invention is to provide ink compositions which overcome one or more of the above-described disadvantages.

A further feature of the present invention is to provide an ink composition which requires less cure energy and/or has improved storage stability.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a carbon black having a moisture content of at least 0.5% and/or a volatile content of from about 1.5% to about 3.5% and at least one of the following properties: an Iodine number of from about 40 mg/g to about 75 mg/g, a DBP absorption of from about 40 cc/100 g to about 70 cc/100 g, a tint strength of from about 70 to about 100; and/or a nitrogen surface area of from about 40 to about 75 m$^2$/g.

The present invention further relates to compositions containing the above-described carbon black, such as, but not limited to, ink compositions containing the above-described carbon black along with, for instance, at least one liquid vehicle or carrier.

The present invention also relates to a method to reduce the cure energy of an ink by using the above-described carbon black.

The present invention further relates to a method to improve storage stability using the above-described carbon black in an ink composition.

It is to be understood that both the foregoing general description and the following detailed description are exemplary and explanatory only and are intended to provide a further explanation of the present invention, as claimed.

DETAILED DESCRIPTION OF THE PRESENT INVENTION

Figure 1:
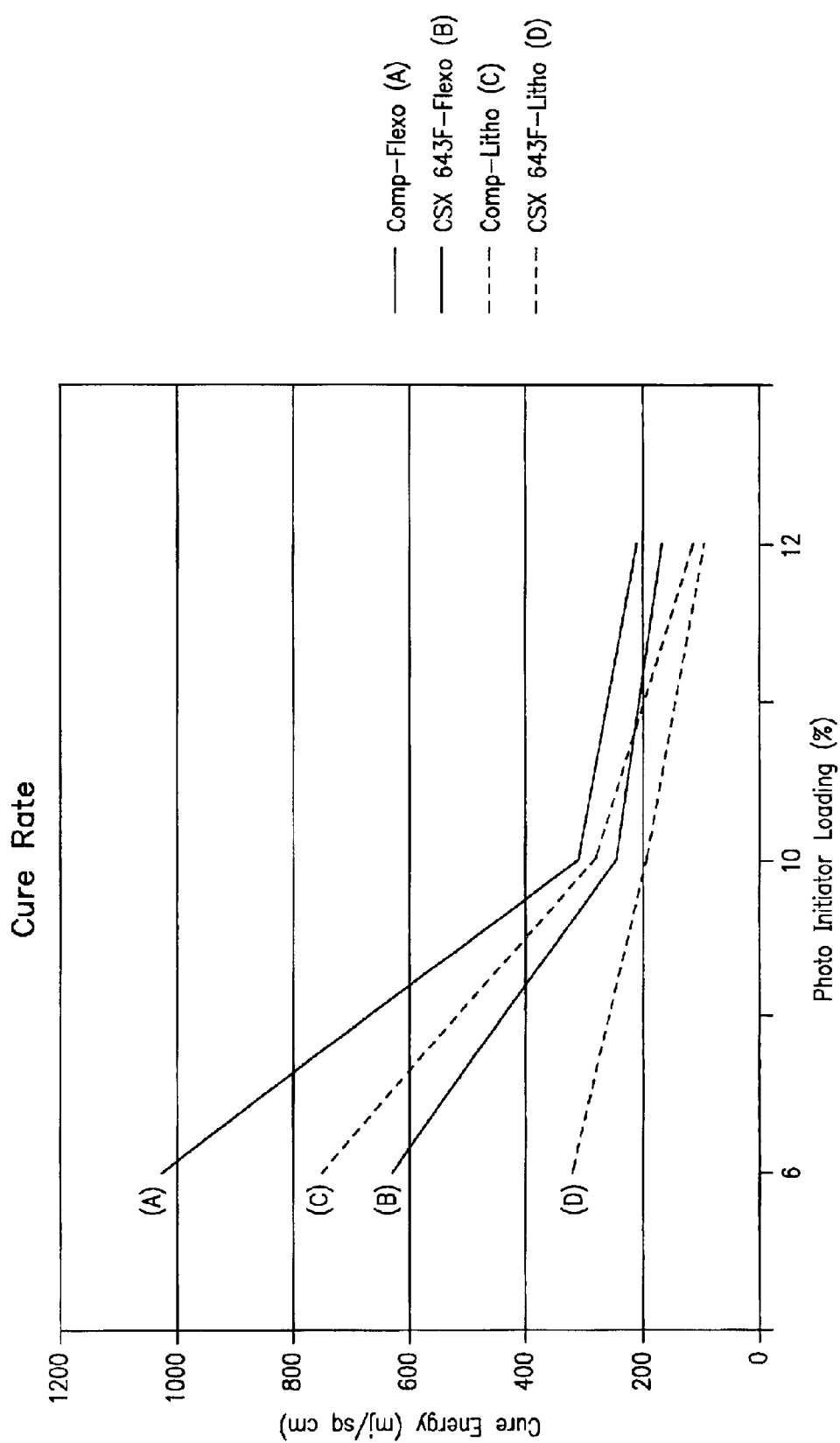
FIG. 1 is a graph showing the cure rate of an ink containing the carbon black of the present invention compared to an ink containing conventional carbon black. The figure compares the cure energy verses photoinitiator loading.

The present invention relates to novel carbon blacks and the use of these carbon blacks in compositions, such as ink and coating compositions.

With respect to the carbon black, the carbon black of the present invention preferably has the moisture content and/or the volatile content discussed below and at least one other analytical property as described below.

In more detail, the carbon black of the present invention preferably has a moisture content of at least 0.5%, and more preferably from about 0.5% to about 10.0%, and even more preferably from about 0.6% to about 6.0%. Other suitable moisture content ranges for purposes of the present invention include, but are not limited to, from about 0.7% to about 2.0% and from about 0.80% to about 1.2%. The moisture content is measured by ASTM D-1509.

In the alternative, instead of the above-identified moisture content or in combination with the moisture content, the carbon black of the present invention can have a volatile content as described below in association with at least one of the following analytical properties as described below. The volatile content for purposes of the present invention can preferably be from about 1.5% to about 3.5%, and more preferably from about 1.5% to about 2.7%, and even more preferably from about 1.75% to about 2.5%, and most preferably from about 2% to about 2.3%. The volatile content is determined by ASTM D-1620-60.

The carbon black of the present invention, as indicated above, preferably has the above-described moisture content and/or volatile content in association with at least one of the following analytical properties and preferably at least two or more of the following analytical properties.

The carbon black of the present invention preferably has an Iodine number of from about 40 mg/g to about 75 mg/g, and more preferably from about 50 mg/g to about 65 mg/g, and even more preferably from about 55 mg/g to about 60 mg/g. The Iodine number is determined by ASTM D-1510.

The carbon black preferably has a DBP absorption of from about 40 cc/100 g to about 70 cc/100 g, and more preferably from about 42 cc/100 g to about 60 cc/100 g, and even more preferably from about 45 cc/100 g to about 51 cc/100 g. The DBP absorption is determined by ASTM D-2414.

The carbon black of the present invention can also preferably have a tint strength of from about 70 to about 100, and more preferably from about 75 to about 85, and even more preferably from about 80 to about 85. The tint strength is determined by ASTM D-3265 (%IRB#3).

The carbon black of the present invention can also preferably have a nitrogen surface area of from about 40 m$^2$/g to about 75 m$^2$/g, and more preferably from about 40 m$^2$/g to about 60 m$^2$/g, and even more preferably from about 43 m$^2$/g to about 55 m$^2$/g, and most preferably from about 48 to about 50 m$^2$/g. The nitrogen surface area is determined by ASTM D-3037.

The carbon black of the present invention is preferably made to have one or more of the above-described analytical properties in association with either the moisture content or the volatile content or both. The carbon black of the present invention can be made using the carbon black production process described in U.S. Reissue Pat. No. 28,974; U.S. Pat. Nos. 3,619,140; 3,922,335; and 3,725,103. In addition, since the carbon black of the present invention preferably is prepared by nitric acid oxidation to achieve the volatile content and/or moisture content, the process of achieving this nitric acid oxidation can accomplished following the description set forth in U.S. Pat. Nos. 2,420,810; 3,398,009; and 3,536,512. Other methods that can be used to produce the preferred oxidized carbon blacks of the present invention include U.S. Pat. Nos. 3,216,843; 3,279,935; and 3,318,720. All of these patents and any other patents and publications mentioned throughout this application are incorporated in their entirety by reference herein and form a part of the present application. The above-described patents provide detailed processes in making carbon blacks and these processes can be adjusted to produce the various preferred analytical properties of the carbon black of the present invention as described herein.

Furthermore, the carbon blacks of the present application can be further modified to include at least one organic group attached to the carbon black. The types of organic groups that can be attached include the organic groups described in U.S. Pat. Nos. 6,336,965; 6,221,143; 6,069,190; 6,068,688; and 6,042,643, all incorporated by reference herein. The organic groups attached to the carbon black can be used to modify and improve the properties of a given carbon black for a particular use. If desired these organic groups attached to the carbon black may also be chemically changed using means known in the art into other groups for a particular use. For example, an acid group can be converted to its salt or its amide.

The carbon blacks of this invention may be used in the same applications as conventional carbon blacks.

Carbon black products according to the invention have been prepared and evaluated in a number of end use applications. These uses include, for example, plastic compositions, inks, coatings, toners, rubber and tire compositions, paper compositions and textile compositions.

With respect to the ink and coating compositions using the carbon blacks of the present invention, the carbon blacks of the present invention can be incorporated into a conventional ink and/or coating compositions. Furthermore, an ink composition or coating composition can contain at least one carbon black of the present invention in combination with at least one liquid vehicle or carrier which may be organic or inorganic. While any amount of carbon black can be present with the ink and coating compositions of the present invention, preferably at least 0.10 wt % of the carbon black, based on the weight of the ink or coating composition, can be used. Preferably, from about 5% to about 70% by weight or more of the carbon black of the present invention can be used in an ink or coating composition based on the weight of the ink or coating composition. As indicated above, preferably, the carbon black is used to form lithographic and flexographic inks. Other inks that can be used include letterpress inks and rotogravure inks. Examples of suitable lithographic inks that can use the carbon blacks of the present invention include those described in U.S. Pat. Nos. 5,948,843; 5,811,481; 5,628,914; and 5,552,467, all incorporated in their entirety by reference herein. Furthermore, the carbon blacks of the present invention can be used in the flexographic ink compositions described, for instance, in U.S. Pat. Nos. 6,293,195; 6,024,016; 4,798,228; 4,640,714; 4,612,052; 4,508,868; 4,425,848; 4,408,527; and 4,321,178, all incorporated in their entirety by reference herein. UV curable and/or EB curable inks containing the carbon black are preferred inks. These type of inks contain a diluent or carrier, such as a monomer or oligomer, such as shown in the Examples. Details of these type of inks can be found in "Radiation Curing of Printing Inks" by Anthony J. Bean—Chapter 8 of *Radiation Curing: Science and Technology*, edited by S. Peter Pappas, Plenum Press, New York 1992; "UV Radiation Curable Inks & Coatings" by A. J. Singh—Journal of the Colour Society, October/December 1985–January/March 1986 Pages 17–19; and "UV/EB Curing Primer 1: Inks, Coatings, Adhesives" Published by RadTech International North America Northbrook, Ill. Copyright January 1997, all incorporated by reference herein and can be used in the present invention.

The carbon blacks of the present invention can be used in combination with other colorants, in any combination. Other known ink additives may be incorporated into the ink formulation. In general, an ink consists of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of inks, see *The Printing Manual, 5$^{th}$ Ed.*, Leach et al, Eds. (Chapman and Hall, 1993), incorporated by reference herein. Various ink compositions are also disclosed, for example, in U.S. Pat. Nos. 2,833,736; 3,607, 813; 4,104,833; 4,308,061; 4,770,706; and 5,026,755, all incorporated by reference herein. The carbon black products of the invention, either as predispersion or as a solid, can be incorporated into an ink formulation using standard techniques.

Flexographic inks represent a group of ink compositions. Flexographic inks generally include a colorant, a binder, and a solvent. The carbon black products of the invention, are useful as flexographic ink colorants.

The carbon black products of the invention can be used in news inks. For example, a news ink composition may comprise a liquid vehicle, the carbon black products of the invention, a resin and conventional additives such as antifoam additives or a surfactant.

The carbon black products of the invention may also be used in coating compositions such as paints or finishes. Thus, an embodiment of the invention is an improved coating composition comprising a liquid vehicle, resin and a carbon black, the improvement comprising the use of a carbon black product according to the invention. Other known coating additives may be incorporated into the coating compositions. See, for example, McGraw-Hill, *Encyclopedia of Science & Technology, 5$^{th}$* Ed. (McGraw-Hill), 1982). See also U.S. Pat. Nos. 5,051,464, 5,319,044, 5,204,404, 5,051,464, 4,692,481, 5,356,973, 5,314,945, 5,266,406, and 5,266,361, all incorporated by reference herein. The carbon black products of the invention, either as a predispersion or as a solid, can be incorporated into a coating composition using standard techniques The carbon black products of this invention may be used as pigments or colorants in a plastic material. Thus, the invention relates to an improved plastic composition comprising a plastic and a carbon black, the improvement comprising the use of a carbon black product according to the invention.

As with conventional carbon blacks, the carbon black products can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether; and blends and alloys of the above with rubber modifiers. Typical thermosetting resins include: (1) alkyds; (2) allylics; (3) aminos (melamine and urea); (4) epoxies; (5) phenolics; (6) polyesters; (7) silicones; and (8) urethanes.

Generally, the carbon black product is added like any other pigment to the plastic used to form a plastic premix. This can be done, for example, in a dry mix or a melt stage. The carbon black products of the invention may be used in combination with other conventional additives in plastic compositions. According to the invention, the term plastic composition includes, but is not limited to, any plastic material, article, goods, surface, fabric, sheet, and the like. For example, plastic materials include automotive parts, siding for homes, liners for swimming pools, roofing materials, packaging materials, and any variety of other household or industrial items.

The carbon black products of the invention may also be used in paper compositions. Accordingly, the invention relates to an improved paper product comprising paper pulp and a carbon black, the improvement comprising the use of a carbon black according to the invention. The carbon black products of the invention, either as a solid or a predispersion, can be incorporated into paper pulp using standard papermaking techniques as with conventional carbon blacks.

The paper products of the invention may incorporate other known paper additives such as sizing agents, retention aids, fixatives, fillers, defoamers, deflocculating agents, and the like.

The carbon black products of the invention may also be used as with conventional carbon blacks, as pigments, fillers, and reinforcing agents in the compounding and preparation of rubber and elastomeric compositions. Accordingly, the invention relates to an improved rubber composition containing rubber and a carbon black, the improvement comprising the use of a carbon black product according to the invention.

The carbon black products may be mixed with natural or synthetic rubbers by normal means, for example by milling. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber. The carbon black products of the invention may also be used with synthetic rubbers such as: copolymers of from abut 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3-butadiene, styrene, isoprene, isobutylene, 2,3-dimethyl-1,3-butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

The carbon black products of this invention may also be used to color fibers or textiles. Accordingly, the invention relates to improved fiber and textile compositions comprising a fiber or textile and a carbon black, the improvement comprising the use of a carbon black according to the invention. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk and linen are used. The carbon black products of the present invention may be colored by means known in the art to color fibers and textiles with, for example, direct and acid dyes. For a general discussion of coloring with dyes, see Kirk-Othmer *Encyclopedia of Chemical Technology*, Vol 8 pp 280–350 "Dyes, Application and Evaluation" (John Wiley and Sons, 1979), all incorporated by reference herein.

As indicated above, the inks of the present application have preferably improved cure energy properties. In other words, the inks of the present application require less cure energy to cure. This is quite advantageous to the end users of the ink since a faster curing ink will require less energy and thus less expense to produce a cured ink. The cure energy of the inks of the present application preferably require at least 10% less than an ink having the same amount of carbon black and having analytical properties which are similar to the analytical properties of the carbon blacks of the present invention except with respect to volatile content and/or moisture content. FIG. 1 of the present application clearly shows the benefits of the carbon blacks of the present invention when used in a flexographic ink as well as a lithographic ink.

Accordingly, the carbon blacks of the present invention as well as their use in ink and coating compositions overcome numerous disadvantages of conventional inks and other uses.

The present invention will be further clarified by the following examples, which are intended to be exemplary of the present invention.

EXAMPLES

Analytical Methods
ASTM Methods as Identified Above.

Various UV curable lithographic and UV curable flexographic inks were prepared for purposes of these examples. The carbon black used to represent an embodiment of the present invention had the following analytical properties:

| Property | Present Invention (CSX 643) |
| --- | --- |
| Iodine Number (mg/g) ASTM D-1510 | 57.9–58.2 |
| DBP Absorption (cc/100 g) ASTM D-2414 | 48.7–55.5 |
| Tint Strength (% IRB#3) ASTM D-3265 | 80.0–82.1 |
| Volatile Content (%) ASTM D-1620-60 | 2.0–2.2 |
| Nitrogen Surface Area (m$^2$/g) ASTM D3037 | 48.6–49.7 |
| Moisture (%) ASTM D-1509 | 0.81–1.1 |

Besides the carbon black of the present invention, for comparison purposes, three samples of a carbon black having the following analytical properties was used for comparison purposes and identified as carbon black COMP:

| | | | |
| --- | --- | --- | --- |
| Iodine Number (mg/g) | 55.4 | 51.3 | 56.8 |
| DBP Absorption (cc/100 g) | 45.4 | 51.5 | 47.2 |
| Tint Strength (% IRB#3) | 85.5 | 83.1 | 92.3 |
| Volatile Content (%) | 1.0 | 1.43 | 1.16 |
| Nitrogen Surface Area (m$^2$/g) | 50.3 | 45.5 | 45.1 |
| Moisture (%) | 0.4 | 0.47 | 0.34 |

Also, carbon blacks identified as Regal® 250 carbon black, Regal® 350 carbon black, and Regal® 400® carbon black (all from Cabot Corporation) were used as well in the ink formulations described below.

UV Flexographic Ink Formulation—#1

| | |
| --- | --- |
| Actilane 515 | 25% (by weight) |
| Actilane 276 | 10% |
| Actilane 440 | 25% |
| Actilane 421 | 14% |
| Viacure DX | 6% |
| Solesperse 32000 | 5% |
| Carbon Black | 15% |

Actilane products from Akzo Nobel
Viacure from UCB Chemicals
Solesperse from Avecia Also used 2 other photo initiators:
Viacure LX from UCB Chemicals
Blend of 30% Quantacure EPD, 10% Isopropylthioxanthone, 30% Irgacure 369 and 30% Irgacure 651
Irgacure 369 and 651 are from Ciba Speciality Chemicals
Isopropylthioxanthone and Quantacure are from Biddle Sawyer UV Lithographic Formulation #2

| Pigment | 20% (by weight) |
| --- | --- |
| 1), Actilane 540, (Polyesther Acrylate Oligomer) | 23% |
| 2), Actilane 515, (Polyesther oligomer) | 28–26–24% |
| 3), Actilane 260GP25, (trifunctional aliphatic urethane) | 10% |
| 4), Actilane 432 (glycerol propoxylate triacrylate monomer) | 10–8–6% |
| 5), Lancowax TF 1778 | 2% |
| 6), Mikrotalc 600, (anti misting talc) | 1% |
| 7), Cure All 200, (photoinitiator blend) | 6–10–14% |

1–4 Akcros Chemicals
5 Lubrizol Corporation
6 Landers Segal Lansco Colors
7 Trilogy Group, UV Flexographic Formulation #3

| Pigment | 15% (by weight) |
| --- | --- |
| 1), Actilane 515, (Tetrafunctional Polyesther Oligomer) | 25% |
| 2), Actilane 276, (Tetrafunctional Aliphatic Urethane Oligomer) | 10% |
| 3), Actilane 440, (PPTTA-monomer) | 25% |
| 4), Actilane 421, (PONPGDA-monomer) | 14–10–6% |
| 5), Viacure DX, (photoinitiator package) | 6–10–14% |
| 6), SolSperse 3200, (dispersant) | 5% |

1–4 Akcros Chemicals
5 UCB Chemicals
6 Avecia

In these examples, one of the above-described carbon blacks was used in the Formulations #2 or #3 as shown in the Figures. Each of these inks were then printed onto a substrate and cured by UV energy until the ink was fully cured. The various properties as shown in FIGS. 1–4 were then determined.

As can be seen in FIG. 1, the conventional flexographic ink containing a carbon black identified as (A), and required over 1,000 mJ/sq cm to cure while the ink composition of the present invention containing the same amount of carbon black but using the carbon black of the present invention required approximately 400 less mJ/sq cm which is a significant reduction in the cure energy at a photoinitiator loading of 6%. Similar reductions were also seen in the lithographic ink area as shown in FIG. 1 wherein the lithographic ink identified as (C) which contained conventional carbon black had a significantly higher cure energy compared to the lithographic ink of the present invention identified as (D).

Figure 2:
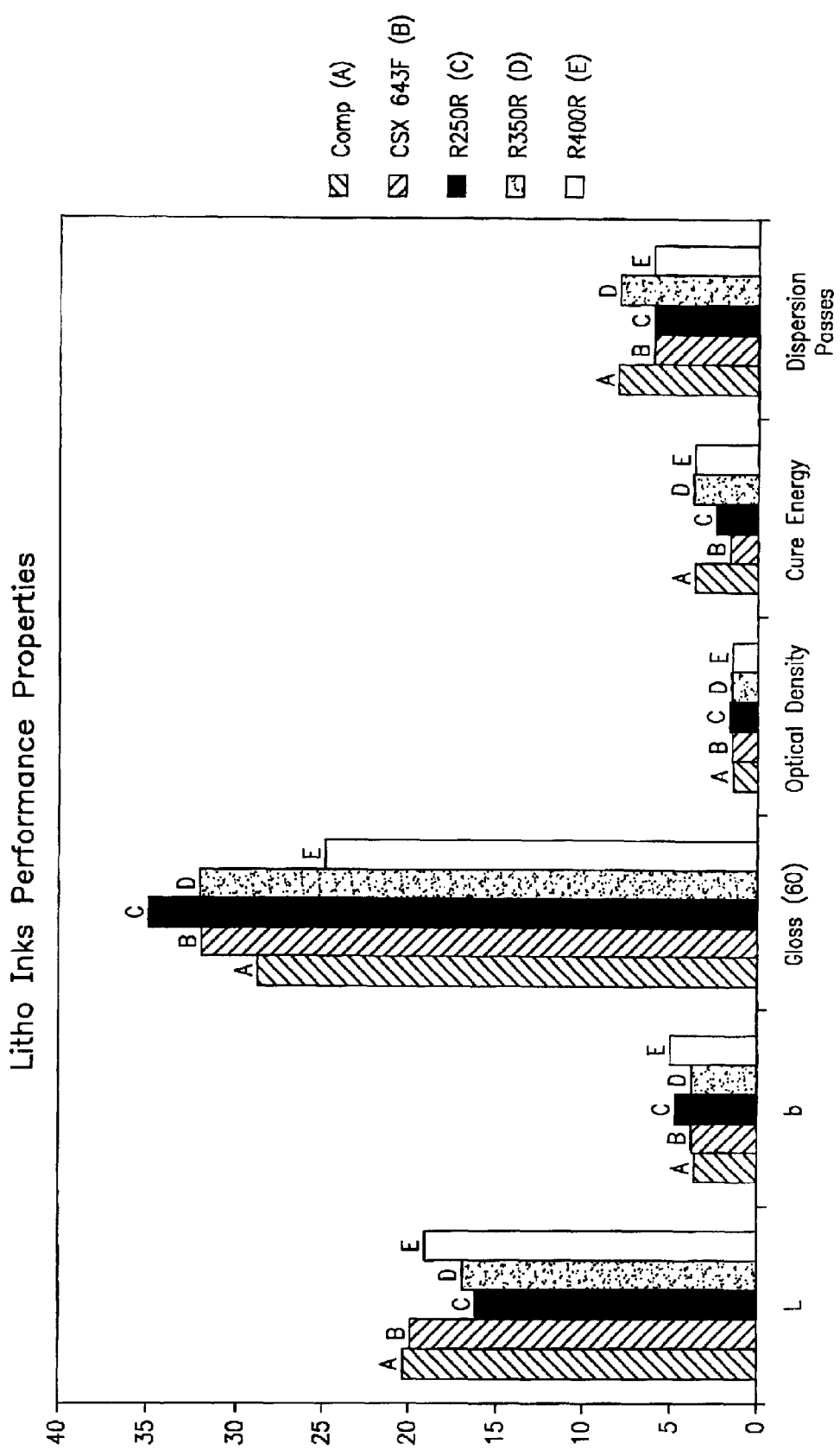
FIG. 2 sets forth a comparison of lithographic ink performance properties of the ink of the present invention compared to other inks in a bar graph format for lithographic inks.
Figure 3:
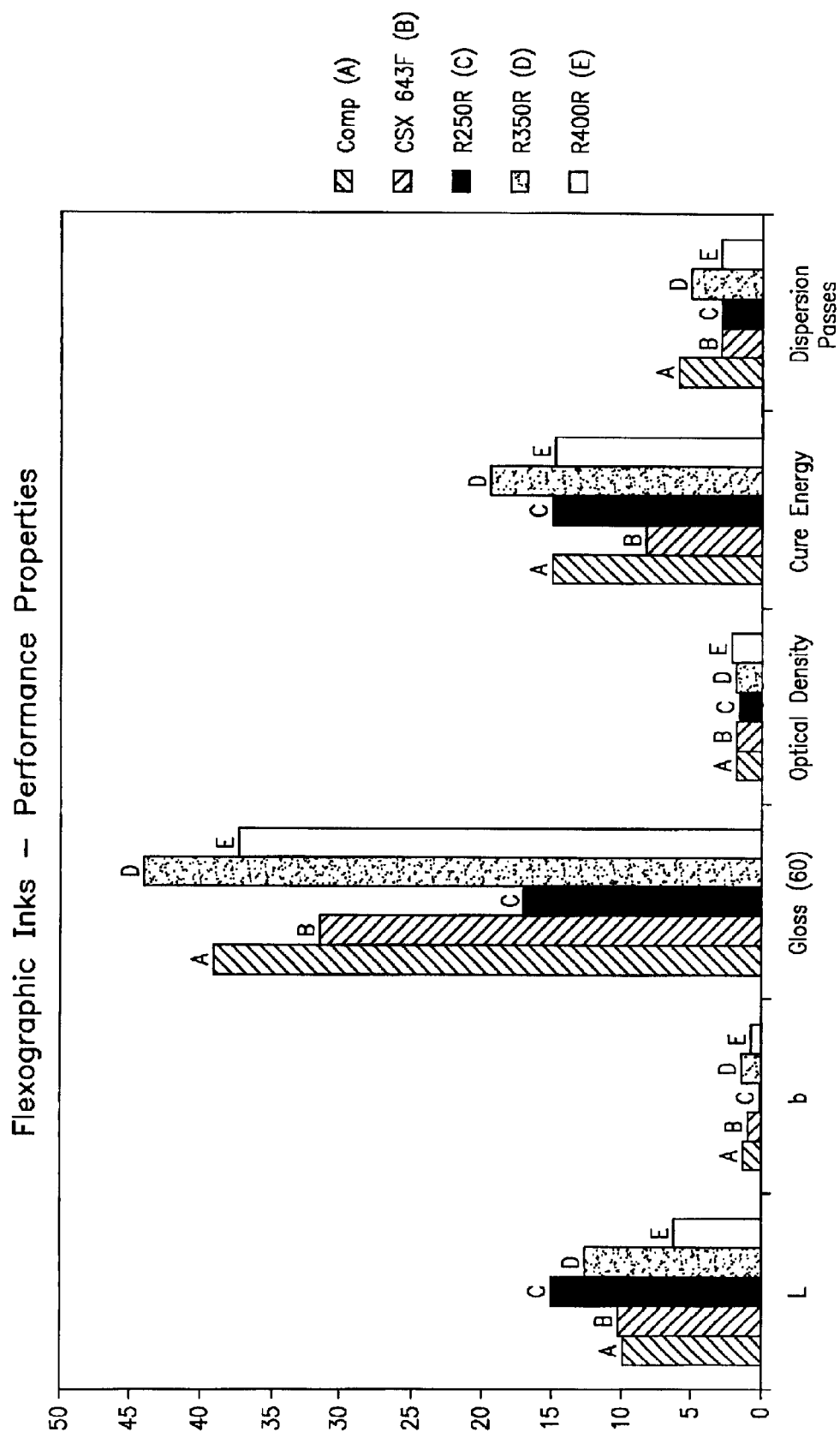
FIG. 3 also is a bar graph which compares the flexographic ink of the present invention with other inks with respect to performance properties.

As shown in FIG. 2, the lithographic inks of the present invention identified as (B) compared to conventional lithographic inks had comparable properties with respect to color, gloss, optical density, and dispersion passes and yet achieved a significantly less cure energy. Thus, the lithographic inks of the present invention had excellent performance properties and yet required less cure energy. The same type of benefits were also seen with respect to flexograpic inks wherein the flexographic ink of the present invention identified as (B) in FIG. 3 had comparable properties with respect to color, gloss, optical density, and dispersion passes and yet achieved a significantly lower cure energy.

Figure 4:
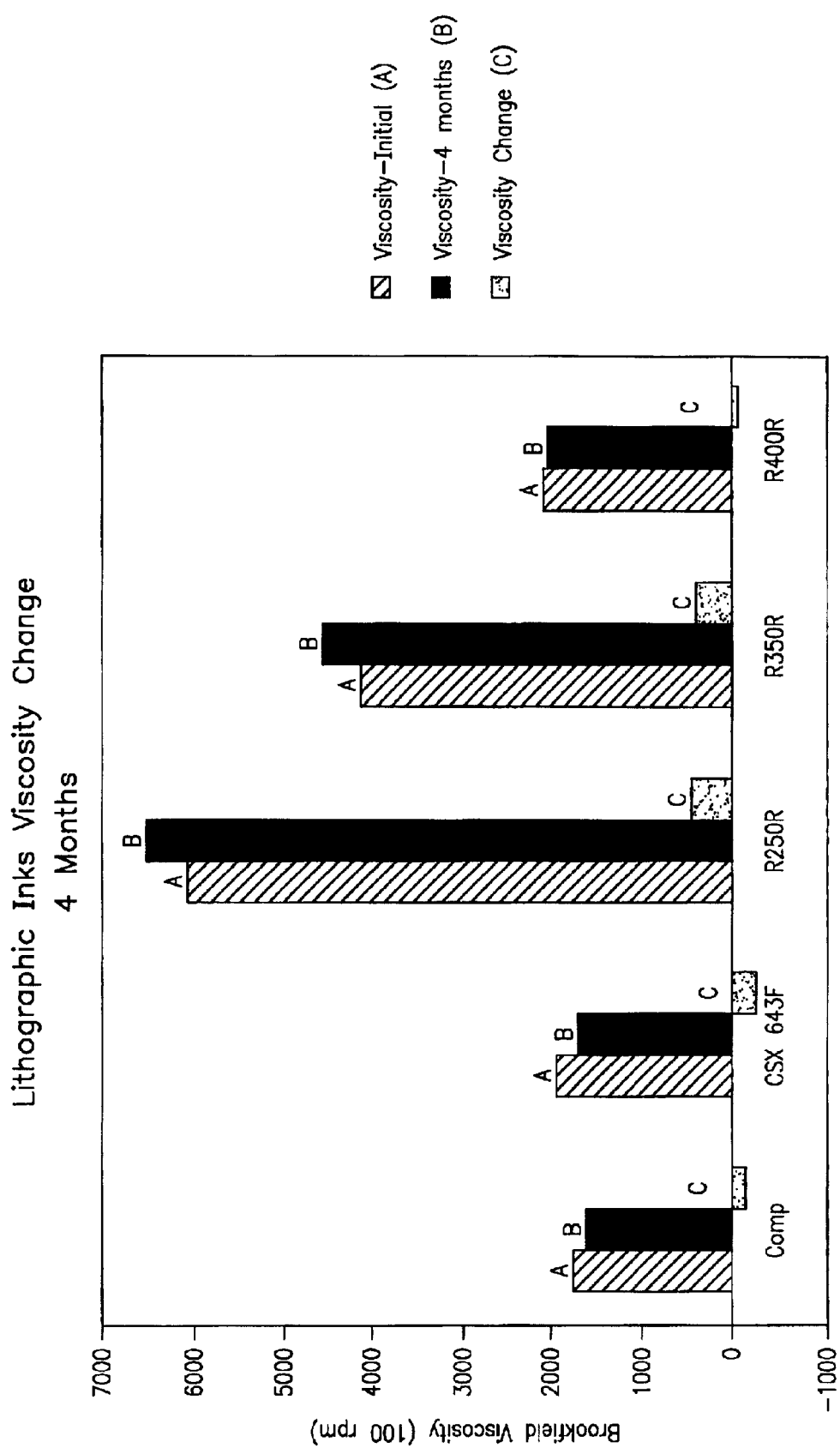
FIG. 4 is also a bar graph showing the viscosity of a lithographic ink of the present invention compared to other inks with respect to viscosity change after 4 months.

Furthermore, the inks of the present invention had excellent storage stability wherein the viscosity of the inks of the present invention did not increase in viscosity over time. Accordingly, one embodiment of the present invention is an ink composition which has an excellent storage stability. The inks of the present invention have a storage stability such that the viscosity even after 4 months does not significantly increase and more preferably actually decreases. This is quite beneficial since an increase in viscosity produces reduced performance and printing difficulties. As can be seen in FIG. 4, the lithographic inks of the present invention identified as (CSX 643F) had no viscosity increase even after 4 months and in fact the viscosity decreased. The viscosity decrease was at least 10% of the initial viscosity.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A carbon black having a moisture content of at least 0.5% and a volatile content of from about 1.5 to about 3.5%, and at least two of the following analytical properties:
   an Iodine number of from about 40 to about 75 mg/g;
   a DBP absorption of from about 40 to about 70 cc/100 g;
   a tint strength of from about 70 to about 100; or
   a nitrogen surface area of from about 40 to about 75 m$^2$/g.

2. The carbon black of claim 1, wherein said carbon black has said at least one of the following properties:
   an Iodine number of from about 50 to about 65 mg/g;
   a DBP absorption of from about 42 to about 60 cc/100 g;
   a tint strength of from about 75 to about 85; or
   a nitrogen surface area of from about 40 to about 60 m$^2$/g.

3. The carbon black of claim 1, wherein said carbon black has said at least one of the following properties:
   an Iodine number of from about 55 to about 60 mg/g;
   a DBP absorption of from about 45 to about 51 cc/100 g;
   a tint strength of from about 80 to about 85; or
   a nitrogen surface area of from about 43 to about 55 m$^2$/g.

4. The carbon black of claim 1, wherein said carbon black has said at least one of the following properties:
   an Iodine number of from about 52 to about 65;
   a DBP absorption of from about 42 to about 60;
   a tint strength of from about 75 to about 85; or
   a nitrogen surface area of from 43 to about 55 m$^2$/g.

5. The carbon black of claim 1, wherein said moisture content is from about 0.5 to about 10.0%.

6. The carbon black of claim 1, wherein said moisture content is from about 0.6 to about 6.0%.

7. The carbon black of claim 1, wherein said moisture content is from about 0.7 to about 2.0%.

8. The carbon black of claim 1, wherein said moisture content is from 0.8 to about 1.2%.

9. The carbon black of claim 1, wherein said volatile content is from about 1.5 to about 3.0%.

10. The carbon black of claim 1, wherein said volatile content is from about 1.75 to about 2.5%.

11. The carbon black of claim 1, wherein said volatile content is from about 2 to about 2.3%.

12. The carbon black of claim 1, wherein said carbon black has the volatile content and moisture content together along with at least three of the analytical properties.

13. The carbon black of claim 1, wherein said carbon black has the volatile content and moisture content together along with all four of the analytical properties.

14. The carbon black of claim 1, wherein said carbon black has the volatile content of from about 1.5 to about 2.7% and a moisture content of from about 0.5 to about 2.0% together along with all of the analytical properties.

15. The carbon black of claim 1, wherein said moisture content is from about 0.5 to 6.0 and said volatile content is from about 1.5 to about 3.0.

16. The carbon black of claim 15, wherein said carbon black has the volatile content and moisture content together along with at least two of the analytical properties.

17. The carbon black of claim 15, wherein said carbon black has the volatile content and moisture content together along with at least three of the analytical properties.

18. The carbon black of claim 15, wherein said carbon black has the volatile content and moisture content together along with all four of the analytical properties.

19. An ink composition comprising at least one liquid vehicle or carrier or diluent and the carbon black of claim 1.

20. The ink composition of claim 19, wherein said ink is a flexographic ink.

21. The ink composition of claim 19, wherein said ink is a lithographic ink.

22. The ink composition of claim 19, wherein said ink is a screen or textile ink.

23. A coating composition comprising at least one liquid vehicle or carrier and at least one carbon black of claim 1.

24. A method to decrease the cure energy of an ink or coating composition, comprising the introduction of at least one carbon black of claim 1 into said ink or coating composition.

25. A method to increase the storage stability of an ink or coating composition comprising introducing at least one carbon black of claim 1 into said ink or coating composition.

26. The ink of claim 19, wherein said ink is a UV curable or EB curable ink.

27. The ink of claim 20, wherein said ink is a UV curable or EB curable ink.

28. The ink of claim 21, where said ink is a UV curable or EB curable ink.

29. A carbon black having a moisture content of at least 0.5% and a volatile content of from about 1.5 to about 3.5%, and at least one of the following analytical properties:
   an Iodine number of from about 55 to about 60 mg/g;
   a DBP absorption of from about 45 to about 51 cc/100 g;
   a tint strength of from about 80 to about 85; or
   a nitrogen surface area of from about 43 to about 55 m$^2$/g.

30. An ink composition comprising at least one liquid vehicle or carrier or diluent and a carbon black having a moisture content of at least 0.5% and a volatile content of from about 1.5 to about 3.5%, and at least one of the following analytical properties:

an Iodine number of from about 40 to about 75 mg/g;

a DBP absorption of from about 40 to about 70 cc/100 g;

a tint strength of from about 70 to about 100; or a nitrogen surface area of from about 40 to about 75 m²/g.

31. A coating composition comprising at least one liquid vehicle or carrier and a carbon black having a moisture content of at least 0.5% and a volatile content of from about 1.5 to about 3.5%, and at least one of the following analytical properties:

an Iodine number of from about 40 to about 75 mg/g;

a DBP absorption of from about 40 to about 70 cc/100 g;

a tint strength of from about 70 to about 100; or a nitrogen surface area of from about 40 to about 75 m²/g.

32. A method to decrease the cure energy of an ink or coating composition, comprising the introduction of a carbon black having a moisture content of at least 0.5% and a volatile content of from about 1.5 to about 3.5%, and at least one of the following analytical properties:

an Iodine number of from about 40 to about 75 mg/g;

a DBP absorption of from about 40 to about 70 cc/100 g;

a tint strength of from about 70 to about 100; or a nitrogen surface area of from about 40 to about 75 m²/g.

33. A method to increase the storage stability of an ink or coating composition comprising introducing a carbon black having a moisture content of at least 0.5% and a volatile content of from about 1.5 to about 3.5%, and at least one of the following analytical properties:

an Iodine number of from about 40 to about 75 mg/g;

a DBP absorption of from about 40 to about 70 cc/100 g;

a tint strength of from about 70 to about 100; or a nitrogen surface area of from about 40 to about 75 m²/g.

34. The ink of claim 30, wherein said ink is a UV curable or EB curable ink.

* * * * *